US006646896B2

(12) United States Patent
Akita et al.

(10) Patent No.: US 6,646,896 B2
(45) Date of Patent: Nov. 11, 2003

(54) CONTROLLER OF AC MACHINE

(75) Inventors: Yoshitoshi Akita, Hitachi (JP);
Toshiaki Okuyama, Tokai (JP);
Koichiro Nagata, Mito (JP); Shigetoshi Okamatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 29 days.

(21) Appl. No.: 10/098,055

(22) Filed: Mar. 15, 2002

(65) Prior Publication Data
US 2003/0043610 A1 Mar. 6, 2003

(30) Foreign Application Priority Data
Aug. 29, 2001 (JP) ........................................ 2001-259123

(51) Int. Cl.[7] .............................. H02M 5/45; H02P 1/24
(52) U.S. Cl. ......................................... 363/37; 318/729
(58) Field of Search .............................. 363/34, 35, 37, 363/50, 55, 56.01; 318/729, 798, 801, 805, 806, 812, 814, 264, 265, 268, 272, 277–279, 286, 430, 434, 438, 453

(56) References Cited

U.S. PATENT DOCUMENTS

| 4,558,265 A | * 12/1985 | Hayashida et al. ......... 318/561 |
| 5,475,293 A | * 12/1995 | Sakai et al. ................ 318/802 |
| 5,583,412 A | * 12/1996 | Nielsen ...................... 318/811 |
| 6,229,719 B1 | * 5/2001 | Sakai et al. .................. 363/37 |

* cited by examiner

Primary Examiner—Matthew V. Nguyen
(74) Attorney, Agent, or Firm—Antonelli, Terry, Stout & Kraus, LLP

(57) ABSTRACT

For use in a system in which a capacitor is connected between an AC machine and an inverter in order to improve the power factor, a controller for an AC machine capable of even when the overvoltage occurs due to the self-excitation between the AC machine and the capacitor, reactivating stably the inverter to continue the running. When the operation of the inverter is stopped and then the inverter is reactivated, the manipulation of starting the switching of the inverter is performed after a DC voltage of the inverter has been decreased to the operating voltage in the running, whereby the reactivation is performed stably without stopping the system.

15 Claims, 4 Drawing Sheets

CONTROLLER OF AC MACHINE

BACKGROUND OF THE INVENTION

1. Field of the Invention

The present invention relates in general to a controller for which a capacitor is connected in parallel with an AC machine between the AC machine and a power inverter in order to improve the power factor, thereby increasing an output of the power inverter. More particularly, the invention relates to a controller which is suitable for when the operation of the power inverter is stopped in running and then the power inverter is reactivated to continue the running thereof.

2. Description of the Related Art

FIG. 8 is a block diagram, partly in circuit diagram, showing a configuration of a controller for an AC machine according to the prior art in which a capacitor is connected in parallel with an AC machine between the AC machine and a power inverter in order to improve the power factor. In FIG. 8, reference numeral 1 designates an AC machine; reference numeral 2 designates an AC power supply; reference numeral 3 designates a power rectifier (a diode rectifier or a converter) for converting an alternating current of the AC power supply 2 into a direct current; reference numeral 4 designates a smoothing capacitor for smoothing the direct current into which the alternating current is converted in the power rectifier 3; and reference numeral 5 designates a power inverter (inverter) for converting the direct current into which the alternating current is converted in the power rectifier 3 into an alternating current. In FIG. 8, reference numeral 6 designates a power factor improving capacitor which is connected between the AC machine 1 and the inverter 5 in order to improve the power factor, and reference numeral 7 designates a reactor which is connected in order to prevent a ripple current generated by the inverter 5 from being caused to flow through the capacitor 6. Also, reference numeral 8 designates a controller for manipulating an output voltage of the inverter 5 to control the AC machine 1.

The power factor is improved by adopting the above-mentioned prior art, thereby being able to increase the inverter output. However, in the case where the capacitor is connected, there is the possibility that when the operation of the inverter is stopped, the self-excitation phenomenon may occur between the capacitor and the AC machine depending on the capacitance of the capacitor to generate the over-excitation (overvoltage). In addition, in the prior art, when the overvoltage is generated, the operation state of the system is judged to be abnormal in order to protect the components to stop the system. Thus, there is the possibility that the system is stopped due to the generation of the overvoltage resulting from the connection of the above-mentioned capacitor to reduce the reliability of the system.

SUMMARY OF THE INVENTION

In the light of the foregoing, the present invention has been made in order to solve the above-mentioned problems associated with the prior art, and it is therefore an object of the present invention to provide a controller for an AC machine which is capable of even in the case where the overload is generated under the state of connecting a capacitor, reactivating a system without stopping the operation of the system to continue the running.

In order to attain the above-mentioned object, a controller for an AC machine according to the present invention, when reactivating an inverter to continue the running thereof after the operation of the inverter has been stopped, starts the switching of the inverter to reactivate the inverter after a detection value of a DC voltage (Vdc in FIG. 8) of the inverter has been decreased down to the operating value in the running.

According to one aspect of the present invention, there is provided a controller for an AC machine for which a capacitor is connected in parallel with an AC machine between the AC machine and a power inverter in order to improve the power factor, wherein when the operation of the power inverter in running is stopped and then the power inverter is reactivated to continue the running, the reactivation is carried out after a DC voltage detection value of the power inverter has been decreased down to the operating voltage in the running.

According to another aspect of the present invention, there is provided a controller for an AC machine for which a capacitor is connected in parallel with an AC machine between the AC machine and a power inverter in order to improve the power factor, wherein when the operation of the power inverter in running is stopped and then the power inverter is reactivated to continue the running, the reactivation is carried out after a lapse of predetermined time from a time point when a voltage value of the AC machine has been decreased from a rising maximum voltage thereof.

According to still another aspect of the present invention, there is provided a controller for an AC machine for which a capacitor is connected in parallel with an AC machine between the AC machine and a power inverter in order to improve the power factor, wherein when the operation of the power inverter in running is stopped and then the power inverter is reactivated to continue the running, the reactivation is carried out after a voltage value of the AC machine has been decreased down to the normal operating voltage.

According to yet another aspect of the present invention, there is provided a controller for an AC machine for which a capacitor is connected in parallel with an AC machine between the AC machine and a power inverter in order to improve the power factor, wherein when the operation of the power inverter in running is stopped and then the power inverter is reactivated to continue the running, the reactivation is carried out after a lapse of predetermined time from a time point when a velocity detection value of the AC machine has been decreased down to a predetermined value.

According to a further aspect of the present invention, there is provided a controller for an AC machine for which a capacitor is connected in parallel with an AC machine between the AC machine and a power inverter in order to improve the power factor, wherein the operation of the power inverter in running is stopped and then the power inverter is reactivated to continue the running, the reactivation is carried out after a velocity detection value of the AC machine has been decreased down to a predetermined value.

Other objects, features and advantages of the invention will become apparent from the following description of the embodiments of the invention taken in conjunction with the accompanying drawings.

DETAILED DESCRIPTION OF THE INVENTION

The embodiments of the present invention will hereinafter be described in detail with reference to the accompanying drawings.

(First Embodiment)

Figure 1:
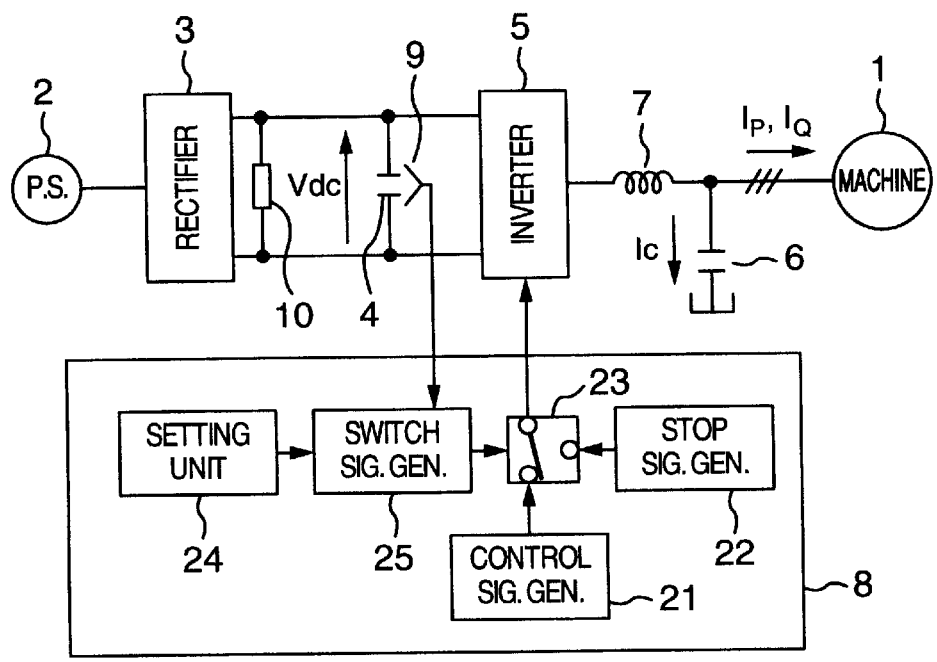
FIG. 1 is a block diagram, partly in circuit diagram, showing a configuration of a controller for an AC machine according to a first embodiment of the present invention.
Figure 8:
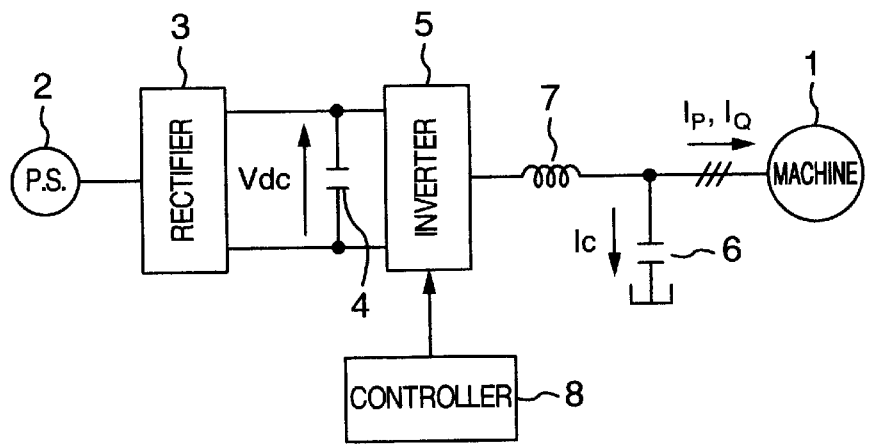
FIG. 8 is a block diagram, partly in circuit diagram, showing a configuration of a controller for an AC machine according to the prior art.

FIG. 1 is a block diagram, partly in circuit diagram, showing a configuration of a controller for an AC machine according to a first embodiment of the present invention. By the way, in FIG. 1, the same constituent elements as those in FIG. 8 are designated with the same reference numerals.

In FIG. 1, reference numeral 9 designates a voltage detector for detecting a voltage developed across the smoothing capacitor 4. Reference numeral 10 designates a discharge resistor which is connected in parallel with the smoothing capacitor 4 in order to discharge therethrough the electric charges accumulated in the smoothing capacitor 4 to reduce the DC voltage. Reference numeral 21 designates a control signal generator for outputting a control signal for the inverter. Reference numeral 22 designates a stop signal generator for outputting a signal which is used to stop the operation of the inverter 5. Reference numeral 23 designates a switch for switching a signal outputted from the control signal generator 21 and a signal outputted from the stop signal generator 22 over to each other to output the signal to the inverter 5. Reference numeral 24 designates a setting unit for setting a DC voltage value when the switching device of the inverter 5 is operated. Also, reference numeral 25 designates a switch signal generator to which a signal outputted from the voltage detector 9 and a signal outputted from the setting unit 24 are inputted to output a switch signal for the switch 23 on the basis of those signals inputted thereto.

Figure 2:
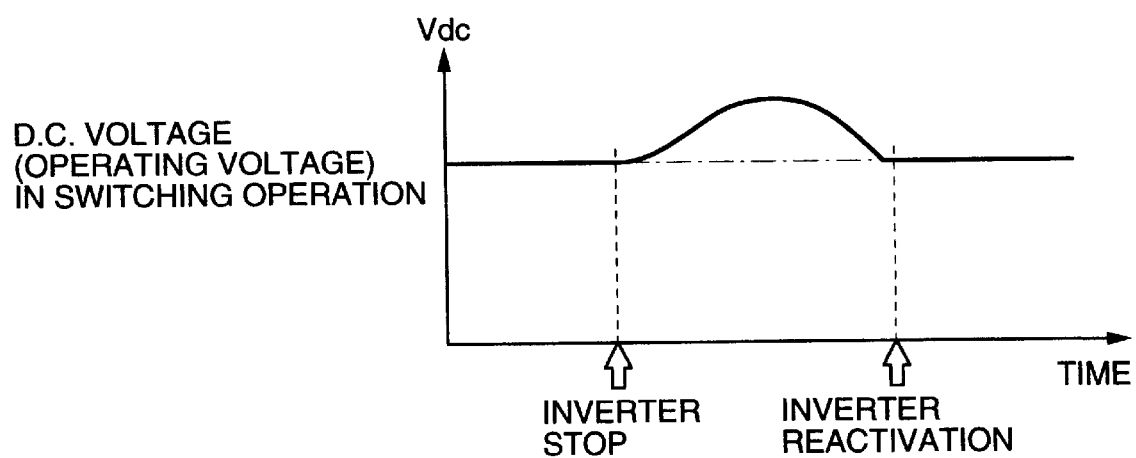
FIG. 2 is a DC waveform diagram useful in explaining the operation of the first embodiment of the present invention.

Next, the description will hereinbelow be given with respect to the operation of the controller for the AC machine of the present embodiment with reference to FIG. 2. FIG. 2 shows the change of the DC voltage Vdc as the voltage developed across the smoothing capacitor 4 in the case where the inverter 5 in running is stopped and then is reactivated. When the operation of the inverter 5 is stopped in running, the self-excitation occurs between the power factor improving capacitor 6 and the AC machine 1 so that the state of the AC machine 1 become the over-excitation and the terminal voltage of the AC machine 1 is increased to provide the overvoltage state. At this time, the DC voltage as the voltage developed across the smoothing capacitor, as shown in FIG. 2, is also increased in proportion to the terminal voltage of the AC machine 1. Now, the width of the overvoltage which is generated to be increased is influenced by the capacitance of the power factor improving capacitor 6. While the effect of improving the power factor can be increased by increasing the capacitor current used to compensate for the reactive current of the the AC machine 1, in the case where the capacitor current caused to flow in such a way as to become equal to or larger than the exciting current of the AC machine, there is the possibility that when stopping the operation of the inverter 5, the current of the difference between the capacitor current and the exciting current is caused to flow as the current for the overexcitation through an induction machine to generate the overvoltage.

Since the breakdown voltage of the switching device of the inverter 5 in the non-switching operation is normally higher than that in the switching operation, there is no problem for the overvoltage during the stop of the inverter. However, in the case where after stopping the operation of the inverter 5, the inverter 5 is reactivated with the DC current being increased, there is the possibility that the DC voltage may exceed the operating voltage in the switching operation.

In the present embodiment, as shown in FIG. 1, the DC voltage value Vdc detected by the voltage detector 9 and the DC voltage value in the switching operation set by the setting unit 24 are compared with each other in the switching signal generator 25, and at a time point when the DC voltage value Vdc has been decreased down to the set value as shown in FIG. 2, the switching signal generator outputs the switching signal to switch the output signal of the switch 23 from the output signal of the stop signal generator 22 over to the output signal of the control signal generator 21 to carry out the reactivation.

As described above, according to the present embodiment, in the system in which the power factor improving capacitor 6 is connected in parallel with the AC machine 1 between the AC machine 1 and the power inverter 5, since even if when stopping the operation of the inverter 5, the overvoltage is generated in the DC voltage due to the self-excitation phenomenon, the inverter 5 is reactivated at a time point when the DC voltage has been decreased down to the voltage in the switching operation, it is possible to run continuously the AC machine without stopping the system.

Second Embodiment

Figure 3:
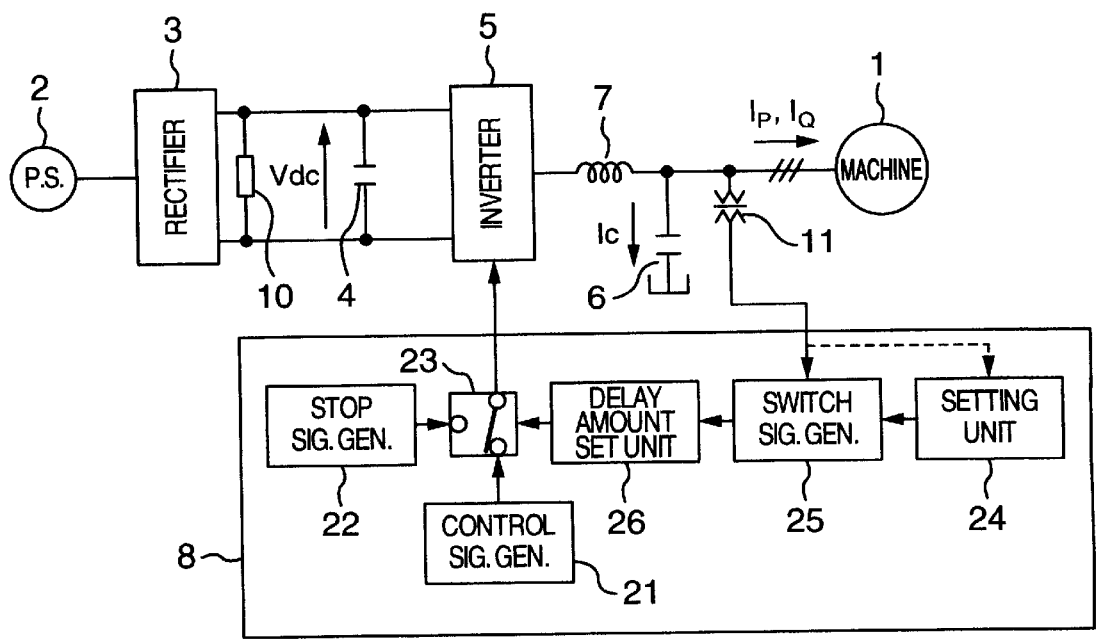
FIG. 3 is a block diagram, partly in circuit diagram, showing a configuration of a controller for an AC machine according to a second embodiment of the present invention.

FIG. 3 shows a configuration of a second embodiment. By the way, in FIG. 3, a point that the switch 23 is manipulated using a voltage detection value of the AC machine 1 is different from the first embodiment shown in FIG. 1. Reference numeral 11 designates a voltage detector for detecting a voltage of the AC machine 1 to output the voltage signal thus detected. Reference numeral 24 designates a setting unit for setting a peak value in the overvoltage or a voltage value in the normal running. Also, reference numeral 26 designates a delay amount setting unit for after a lapse of set delay time with respect to the switching signal outputted by the switching signal generator 25, outputting the switching signal to the switch 23.

Figure 4:
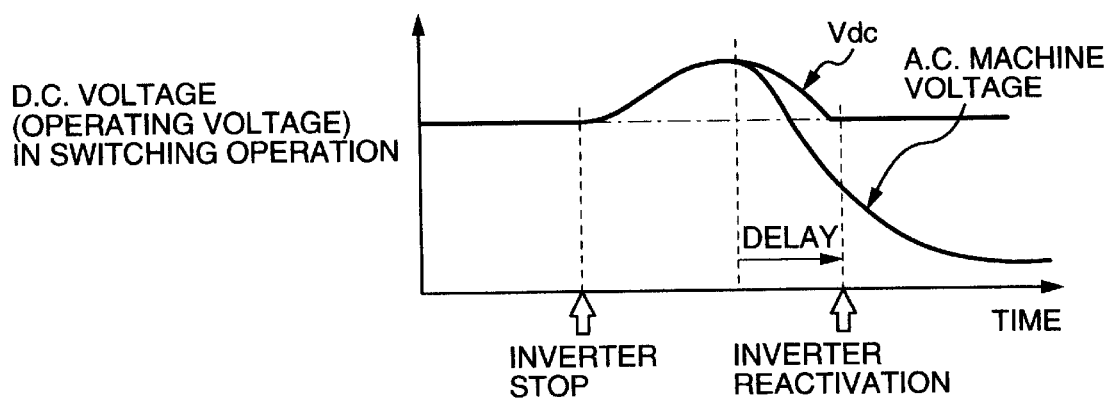
FIG. 4 is a diagram of a DC waveform and an AC machine voltage waveform useful in explaining the operation of the second embodiment of the present invention.

Next, the description will hereinbelow be given with respect to the operation of the present embodiment with reference to FIG. 4. FIG. 4 shows the change of the DC voltage Vdc as the voltage developed across the smoothing capacitor 4 and the terminal voltage of the AC machine 1 detected by the voltage detector 11 when the operation of the inverter 5 in running is stopped and then the inverter 5 is reactivated. As described in the first embodiment, in the case where the power factor improving capacitor 6 is connected, when the operation of the inverter is stopped in running, the terminal voltage of the AC machine 1, as shown in FIG. 4, is increased due to the self-excitation phenomenon caused between the power factor improving capacitor 6 and the AC machine 1 to become the overvoltage state, and the DC voltage as the voltage developed across the smoothing capacitor 4 is also increased in proportion to the terminal voltage of the AC machine 1. At this time, in the case where after the operation of the inverter is stopped, the inverter is reactivated with the DC voltage being increased, there is the possibility that the DC voltage may exceed the operating voltage of the inverter 5 in the switching operation.

Then, in the present embodiment, as shown in FIG. 3, the terminal voltage value of the AC machine detected by the voltage detector 11 and the set value set by the setting unit 24 are compared with each other in the switching signal generator 25 to output the switching signal at a time point when the terminal voltage value has become equal to or smaller than the set value. Then, at a time point when the time delay set by the delay amount setting unit 26 has elapsed, the switching signal is outputted to the switching unit 23 and then the output signal of the switching unit 23 is switched from the output signal of the stop signal generator 22 over to the output signal of the control signal generator 21 to carry out the reactivation.

Now, the description will hereinbelow be given with respect to the set value of the setting unit 24 and the set value of the delay amount setting unit 26. The overvoltage peak value of the DC voltage in the stop of the inverter is the overvoltage peak value of the AC machine 1, and the DC voltage is decreased in accordance with the discharge time constant depending on the resistance value of the discharge resistor 10 and the capacitance value of the smoothing capacitor 4 from at a time point when the voltage of the AC machine 1 has been decreased down to a value smaller than the overvoltage peak value due to the reduction of the velocity due to the external load or the like. Therefore, the terminal voltage of the AC machine after the operation of the inverter 5 has been stopped is successively recorded in the setting unit 24, and at a time point when the terminal voltage of the AC machine 1 has been decreased down to a value lower than the last recorded value, the switching signal is outputted. In this connection, the delay amount may be set which is calculated on the basis of the difference in voltage between the above-mentioned overvoltage peak value and the DC voltage value in the smoothing operation, and the discharge time constant.

By the way, when the time constant in accordance with which the terminal voltage of the AC machine is decreased is larger than the discharge time constant, the terminal voltage of the AC machine 1 and the DC voltage are similarly decreased. Therefore, in this case, the voltage value in the normal running is set in the setting unit 24 and is compared with the output value of the voltage detector 11, and at a time point when the output value of the voltage detector 11 has become equal to or smaller than the set value, the reactivation may be carried out and also zero may be set in the delay amount setting unit 26. As described above, according to the present embodiment, similarly to the first embodiment, it is possible to run continuously the AC machine without stopping the system.

Third Embodiment

Figure 5:
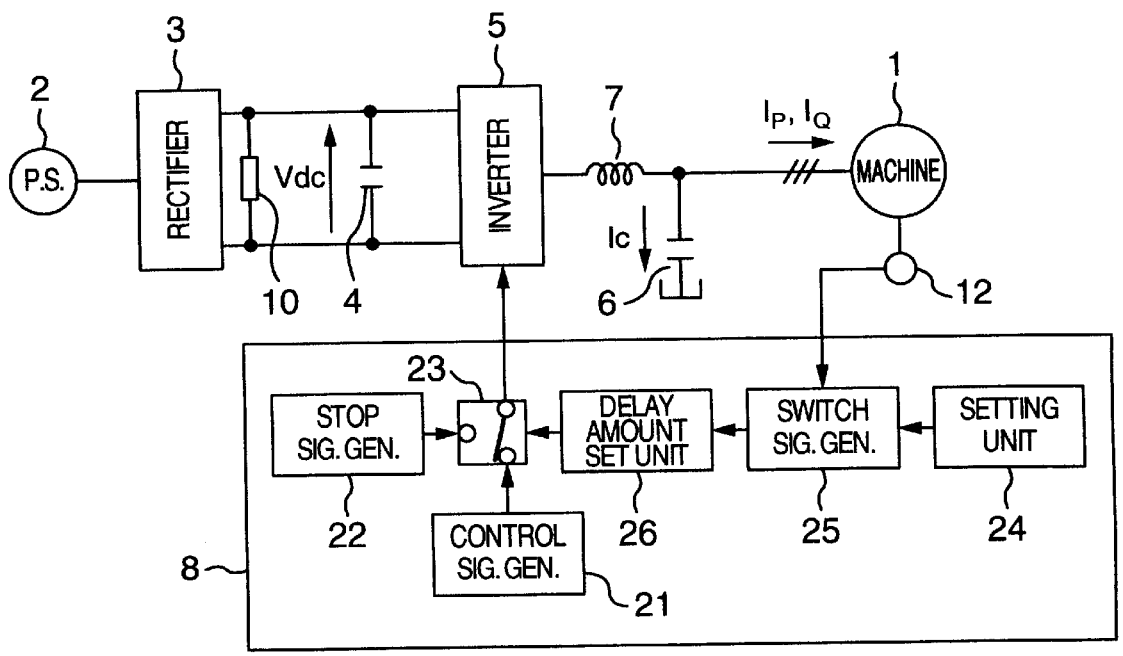
FIG. 5 is a block diagram, partly in circuit diagram, showing a configuration of a controller for an AC machine according to a third embodiment of the present invention.

FIG. 5 shows a configuration of a third embodiment of the present invention. By the way, in the present embodiment shown in FIG. 5, a point that the switching unit 23 is manipulated using a velocity detection value of the AC machine is different from the second embodiment shown in FIG. 3. Reference numeral 12 designates a velocity detector for detecting the velocity of the AC machine 1 to output the velocity detection signal.

Figure 6:
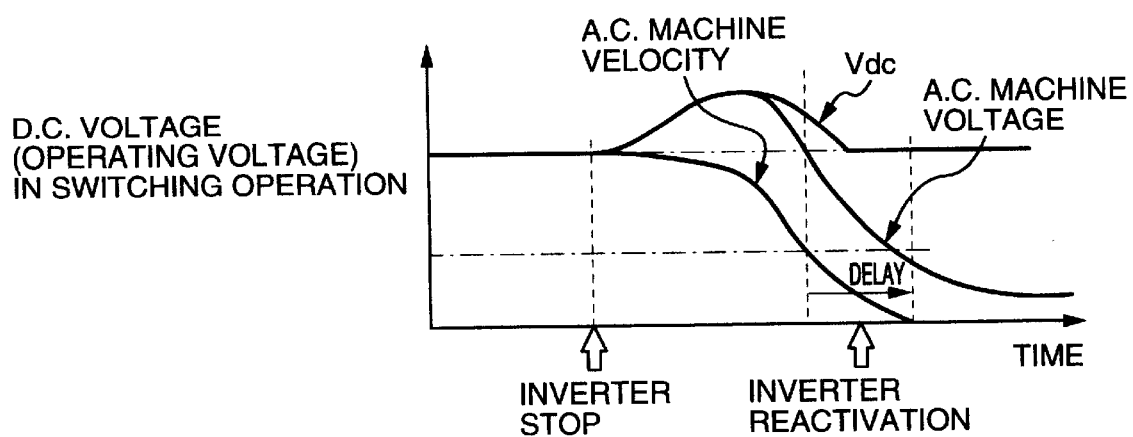
FIG. 6 is a diagram of a DC voltage, an AC machine voltage and a velocity waveform useful in explaining the operation of the third embodiment of the present invention.

Next, the description will hereinbelow be given with respect to the operation of the present embodiment with reference to FIG. 6. FIG. 6 shows the DC voltage Vdc as the voltage developed across the smoothing capacitor 4 the terminal voltage of the AC machine 1 and the velocity of the AC machine 1 which is detected by the velocity detector 12 when the inverter 5 in running is stopped and then is reactivated.

In the case where as described in the first embodiment, the power factor improving capacitor 6 is connected, when the operation of the inverter 5 is stopped in running, the terminal voltage of the AC machine 1, as shown in FIG. 6, is increased due to the self-excitation phenomenon caused between the power factor improving capacitor 6 and the AC machine 1 to become the overload state, and the DC voltage as the voltage developed across the smoothing capacitor 4 is also increased in proportion to the terminal voltage of the AC machine 1. At this time, in the case where after the operation of the inverter 5 is stopped, the inverter 5 is reactivated with the DC voltage being increased, there is the possibility that the DC voltage may exceed the operating voltage in the switching operation.

Since in the present embodiment, the terminal voltage of the AC machine is proportional to the velocity, as shown in FIG. 5, the velocity of the AC machine 1 which is detected by the velocity detector 12 and the value which is set by the setting unit 24 are compared with each other in the switching signal generator 25, and at a time point when the velocity of the AC machine 1 has become equal to or lower than the set value, the switching signal is outputted. Then, at a time point when the delay which is set by the delay amount setting unit 26 has elapsed, the switching signal is outputted to the switching unit 23, and the output signal of the switching unit 23 is switched from the output signal of the stop signal generator 22 over to the output signal of the control signal generator 21 to reactivate the inverter 5.

Next, the description will hereinbelow be given with respect to the set value of the setting unit 24 of the present embodiment and the set value of the delay amount setting unit 26. The overvoltage peak value of the DC voltage in the stop is the overvoltage peak value of the AC machine 1, the terminal voltage of the AC machine 1 is decreased in proportion to the decrease in velocity due to the external load or the like, and on and after a time point when the terminal voltage of the DC machine 1 has become smaller than the overvoltage peak value, the DC voltage is decreased in accordance with the discharge time constant depending on the resistance value of the discharge resistor 10 and the capacitance value of the smoothing capacitor 4. Since the increase in voltage due to the over-excitation and the decrease in voltage due to the decrease in velocity occur at the same time, a time point of the voltage peak can not be grasped on the basis of the velocity detection value. Therefore, the peak value of the overvoltage (over-excitation) is estimated from the current state in running, and the velocity with which the increase in voltage can be cancelled with the decrease in velocity is set in the setting unit 24. Also, the delay amount may be set which is calculated on the basis of the difference in voltage between the estimate of the above-mentioned overvoltage peak and the DC voltage value in the switching operation, and the discharge time constant.

By the way, when the time constant in accordance with which the AC machine velocity is decreased is larger than the discharge time constant, the velocity of the AC machine and the terminal voltage thereof are decreased in proportion to each other. and also the terminal voltage and the DC voltage are decreased similarly to each other. Therefore, at this time, the output value of the velocity detector 12 and the velocity which is set by the setting unit 24 are compared with each other, and at a time point when the output value of the velocity detector 12 has become equal to or smaller than the set value, the reactivation may be carried out. At this time, zero may be set in the delay amount setting unit 26. In such a manner, according to the present embodiment, similarly to the first embodiment, it is possible to run continuously the AC machine without stopping the system.

Fourth Embodiment

Figure 7:
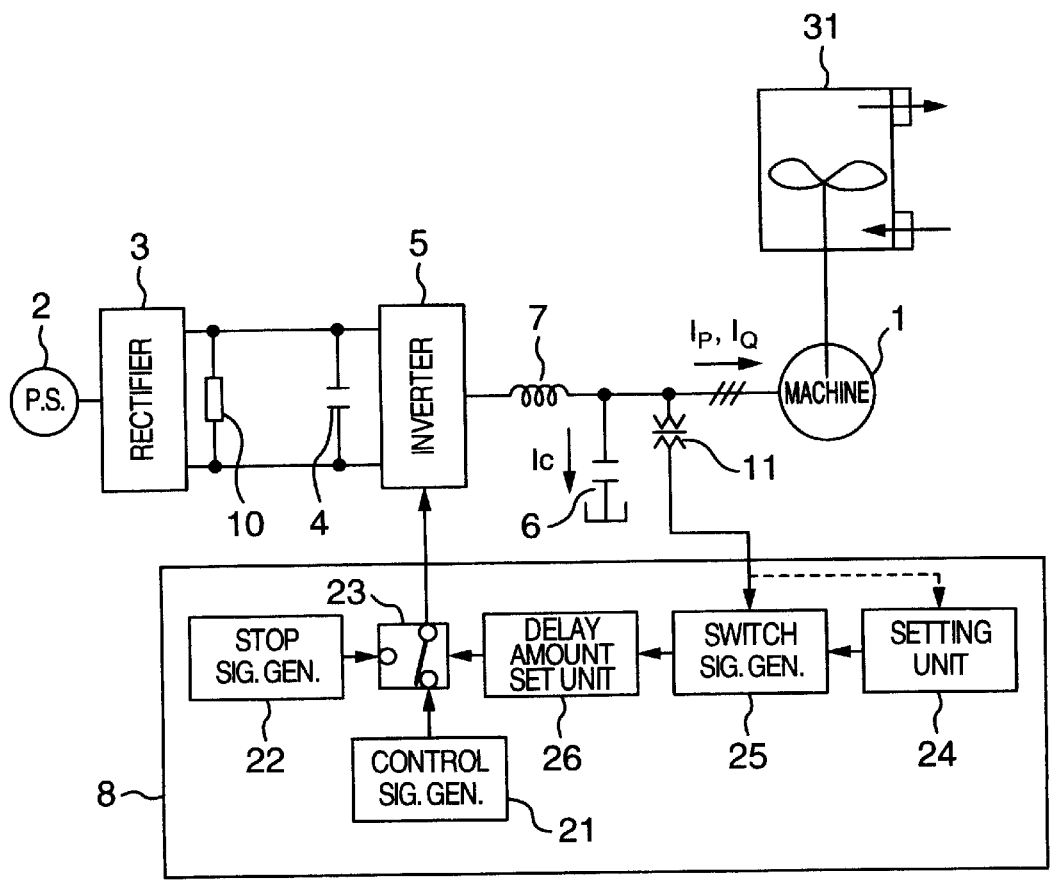
FIG. 7 is a block diagram, partly in circuit diagram, showing a configuration of a controller for an AC machine according to a fourth embodiment of the present invention.

In a fourth embodiment shown in FIG. 7, the controller of the second embodiment shown in FIG. 3 is applied to a system for driving a pump or a fan. In FIG. 7, reference numeral 31 designates a pump or fan system which is connected as the load of the AC machine 1.

In the present embodiment, since the current Ic which is caused to flow through the power factor improving capacitor 6 is proportional to the frequency ω1 of the AC machine 1, the capacitance C of the capacitor and the voltage V1 of the AC machine, it is proportional to ω1 squared under the condition of V1∝ω1. Therefore, in the case where the power factor improvement is carried out at the rated point, since the magnitude of the current which is caused to flow through the power factor improving capacitor 6 is decreased as the velocity of the AC machine 1 is further decreased, the power factor improving effect is reduced. However, since in the system for driving the square gradual decrease load such as a pump or fan, the effective current is decreased beyond the increase in the reactive current due to the reduction of the power factor in the low velocity, no problem occurs in terms of the inverter output.

By the way, while the controller of the second embodiment shown in FIG. 3 is applied to the system of the fourth embodiment shown in FIG. 7, even when the controller shown in FIG. 1 or FIG. 5 is employed, the same effects can be obtained.

As set forth hereinabove, according to a controller for an AC machine of the present invention, even if the overvoltage occurs due to the self-excitation phenomenon caused between a power factor improving capacitor connected between an AC machine and a power inverter, and the AC machine in the stop of an inverter, the reactivation can be stably carried out without stopping a system, and the AC machine can be continuously run.

It should be further understood by those skilled in the art that the foregoing description has been made on embodiments of the invention and that various changes and modifications may be made in the invention without departing from the spirit of the invention and the scope of the appended claims.

What is claimed is:

1. A controller for an AC machine for which a capacitor is connected in parallel with an AC machine between said AC machine and a power inverter in order to improve the power factor,
wherein when the operation of said power inverter in running is stopped and then said power inverter is reactivated to continue the running, the reactivation is carried out after a DC voltage detection value of said power inverter has been decreased down to the operating value in the running.

2. A controller for an AC machine according to claim 1, wherein said capacitor having a static capacitance by which a current caused to flow through said capacitor is adapted to become equal to or larger than an exciting current of said AC machine is connected.

3. A system for driving a fan or a pump employing said controller as defined in claim 1.

4. A controller for an AC machine for which a capacitor is connected in parallel with an AC machine between said AC machine and a power inverter in order to improve the power factor,
wherein when the operation of said power inverter in running is stopped and then said power inverter is reactivated to continue the running, the reactivation is carried out after a lapse of predetermined time from a time point when a voltage value of said AC machine has been decreased down to a value lower than a rising maximum voltage thereof.

5. A controller for an AC machine according to claim 4, wherein said capacitor having a static capacitance by which a current caused to flow through said capacitor is adapted to become equal to or larger than an exciting current of said AC machine is connected.

6. A system for driving a fan or a pump employing said controller as defined in claim 4.

7. A controller for an AC machine for which a capacitor is connected in parallel with an AC machine between said AC machine and a power inverter in order to improve the power factor,
wherein when the operation of said power inverter in running is stopped and then said power inverter is reactivated to continue the running, the reactivation is carried out after a voltage value of said AC machine has been decreased down to the normal running voltage.

8. A controller for an AC machine according to claim 7, wherein said capacitor having a static capacitance by which a current caused to flow through said capacitor is adapted to become equal to or larger than an exciting current of said AC machine is connected.

9. A system for driving a fan or a pump employing said controller as defined in claim 7.

10. A controller for an AC machine for which a capacitor is connected in parallel with an AC machine between said AC machine and a power inverter in order to improve the power factor,
wherein when the operation of said power inverter in running is stopped and then said power inverter is reactivated to continue the running, the activation is carried out after a lapse of predetermined time from a time point when a velocity detection value of said AC machine has been decreased down to a predetermined value.

11. A controller for an AC machine according to claim 10, wherein said capacitor having a static capacitance by which a current caused to flow through said capacitor is adapted to become equal to or larger than an exciting current of said AC machine is connected.

12. A system for driving a fan or a pump employing said controller as defined in claim 10.

13. For use in a system in which a capacitor is connected in parallel with an AC machine between said AC machine and a power inverter in order to improve the power factor, a controller for an AC machine being characterized in that when the operation of said power inverter in running is stopped and then said power inverter is reactivated to continue the running, the reactivation is carried out after a velocity detection value of said AC machine has been decreased down to a predetermined value.

14. A controller for an AC machine according to claim 13, wherein said capacitor having a static capacitance by which a current caused to flow through said capacitor is adapted to become equal to or larger than an exciting current of said AC machine is connected.

15. A system for driving a fan or a pump employing said controller as defined in claim 13.

* * * * *